United States Patent [19]

Christianson et al.

[11] 4,008,423
[45] Feb. 15, 1977

[54] ELECTRICALLY PROPELLED VEHICLE

[75] Inventors: Clinton C. Christianson, Minnetonka, Minn.; Robert F. Bourke, Wilson, Wis.

[73] Assignee: Gould Inc., Rolling Meadows, Ill.

[22] Filed: Feb. 11, 1975

[21] Appl. No.: 548,911

[52] U.S. Cl. .............................. 318/139; 318/338; 318/405; 318/493
[51] Int. Cl.² ..................................... H02P 5/06
[58] Field of Search ........... 318/139, 338, 405, 493

[56] References Cited
UNITED STATES PATENTS

| | | | |
|---|---|---|---|
| 3,378,746 | 4/1968 | Weiser | 318/338 X |
| 3,405,340 | 10/1968 | Ankenman et al. | 318/338 X |
| 3,419,777 | 12/1968 | Asseo | 318/338 |
| 3,716,768 | 2/1973 | Mason | 318/338 X |
| 3,904,947 | 9/1975 | Crews | 318/139 X |

*Primary Examiner*—Gene Z. Rubinson
*Attorney, Agent, or Firm*—Leydig, Voit, Osann, Mayer & Holt, Ltd.

[57] ABSTRACT

A propulsion system for an electrical vehicle including a linear proportional controller operable in a plurality of modes for operating a d.c. drive motor via power derived from a propulsion battery. Low speed operation is achieved in an armature control mode wherein the controller is interposed between the propulsion battery and the motor armature while the motor field is coupled directly across the battery. High speeds are attained in a field control mode wherein the controller is interposed between the battery and motor field while the armature is coupled directly across the propulsion battery, thereby eliminating controller losses from the high current armature circuit. Switching between modes is achieved in a manner which minimizes stress on the switching elements. The controller is also adapted to operate in a charger mode wherein unregulated d.c. power is fed to the controller which functions to regulate the charge provided to the battery. Overall efficiency is increased by use of a dual chopper as a power modulator element. The circuit further includes protection means for controlling or preventing operation under conditions wherein circuit elements might be damaged.

26 Claims, 7 Drawing Figures

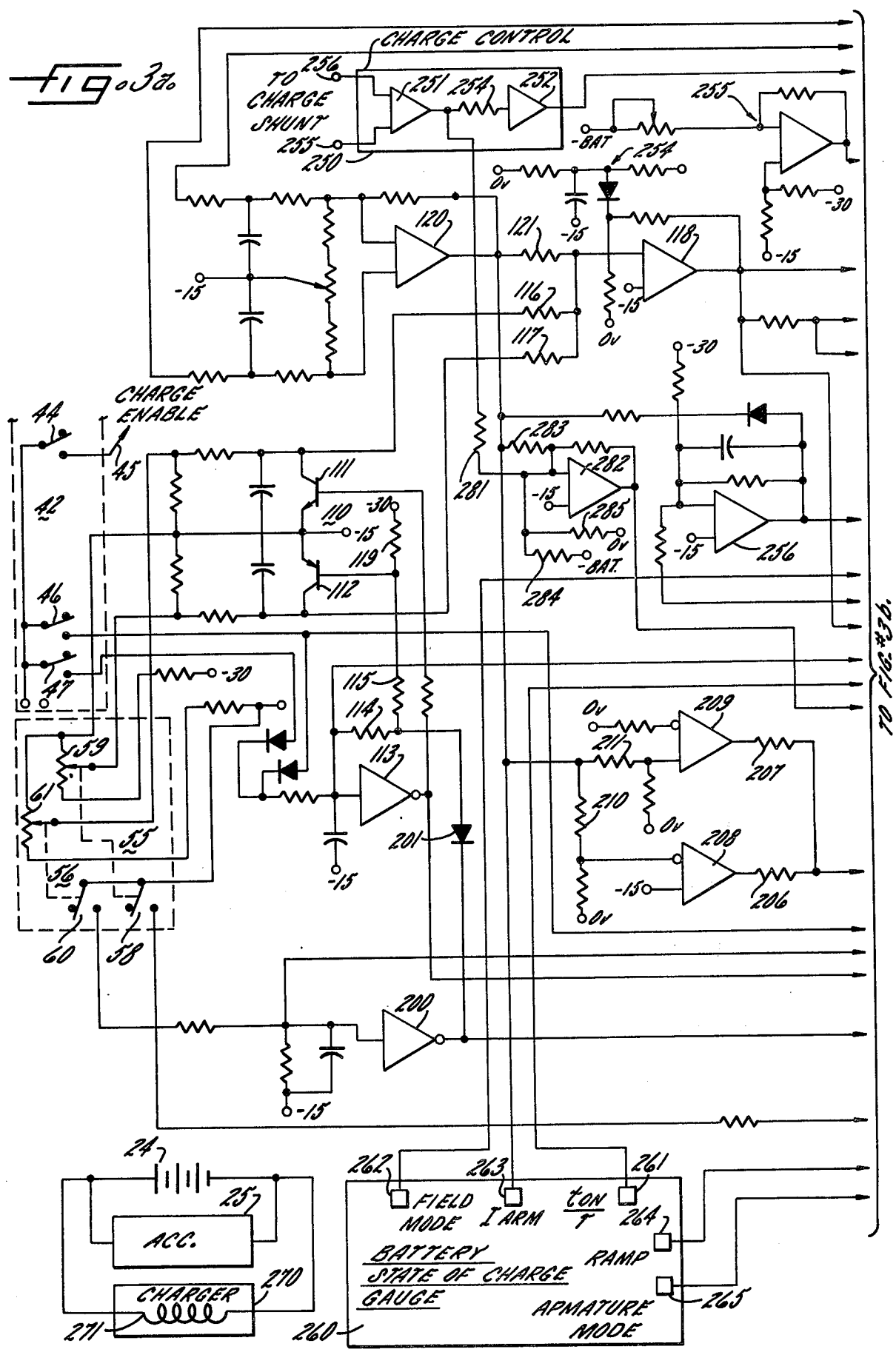

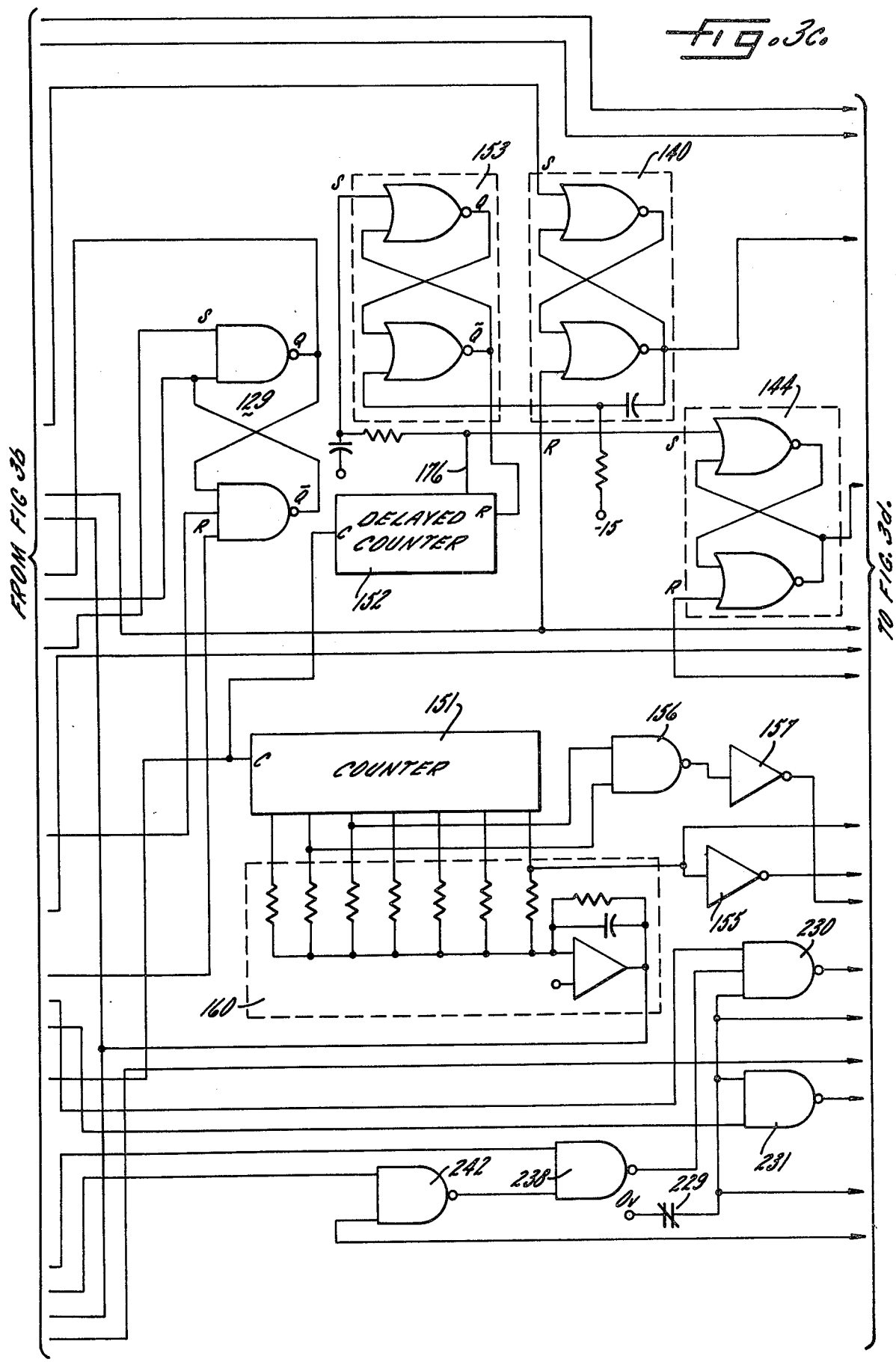

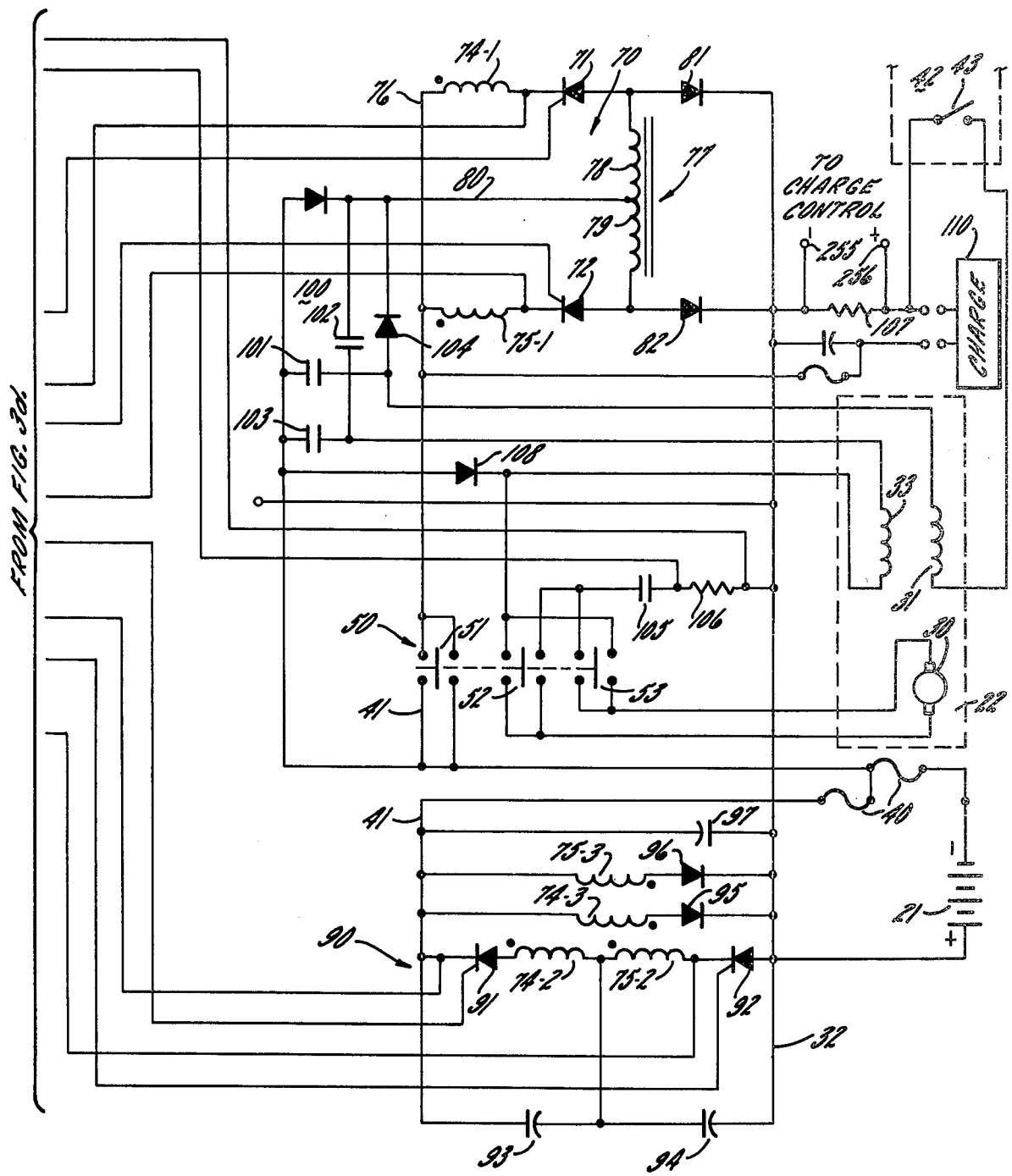

ELECTRICALLY PROPELLED VEHICLE

This invention relates to electrically propelled vehicles and more particularly to those utilizing a proportional controller for controlling the speed and torque produced by a d.c. drive motor.

Electrically powered vehicles are known. For example, vehicles of rather limited capability are available, such as golf carts or lawn vehicles wherein various resistor switching schemes are utilized for controlling the speed of a d.c. motor. Further, electrically powered lift trucks are known incorporating proportional controllers used with either series connected or separately excited d.c. motors. In such controllers, it is typical to utilize a single ended chopper for controlling armature current up to a duty cycle of 70 to 80% at which time the chopper is switched out of the circuit applying full battery voltage to the armature.

All of the foregoing systems are characterized by speed control which is discontinuous over at least portions of the operating range. It is apparent that such operation, while permissible in certain applications, is not adaptable for general use in applications such as on the road vehicles. It will be apparent that use of electrical vehicles in normal traffic requires continuous control of vehicle speed across the entire range thereof.

With the foregoing in mind, it is a general aim of the present invention to provide a propulsion system for an electrical vehicle having continuous control over the entire speed range thereof. In accomplishing the foregoing aim, it is an object to provide a controller in such a vehicle in conjunction with switching means for time sharing the controller to operate in an armature control mode over a first portion of the vehicle speed range, and in a field control mode over a second portion of the vehicle speed range. An even more detailed object is to provide such switching means wherein switching between the aforementioned modes is accomplished with minimal stress on the switching components.

An objective, according to another aspect of the invention, is to provide an electrically powered vehicle with enhanced performance capabilities achieved by efficient utilization of the stored power. In accomplishing that objective, it is an object of the invention to provide a switched mode controller adapted to achieve maximum torque per amp. at low speeds in a first mode, and switchable to a second mode at higher speeds wherein controller losses are minimized. It is a further object to increase efficiency by utilizing regenerative braking techniques to transform the excess kinetic energy of the vehicle into power returned to the battery.

A more detailed object of the invention is to utilize a single controller in a time shared arrangement for operating a d.c. motor in a first armature control mode and in a second field control mode wherein switching between modes is accomplished in a manner wherein the motor sees substantially the same conditions at the instant before and at the instant after switching.

According to still another aspect of the invention, it is an object to provide an electrically powered vehicle having a controller for coupling power from a propulsion battery to a d.c. drive motor, wherein said controller is further adapted to act as a charging regulator for recharging the propulsion battery.

Other objects and advantages will become apparent from the following detailed description, taken in conjunction with the drawings, in which:

FIGS. 3a –3e when joined form a schematic diagram of a controller exemplifying the present invention.

While the invention will be described in connection with a preferred embodiment, it will be understood that there is no intent to limit it to that embodiment. On the contrary, the intent is to cover all alternatives, modifications and equivalents included within the spirit and scope of the invention as defined by the appended claims.

Figure 1:
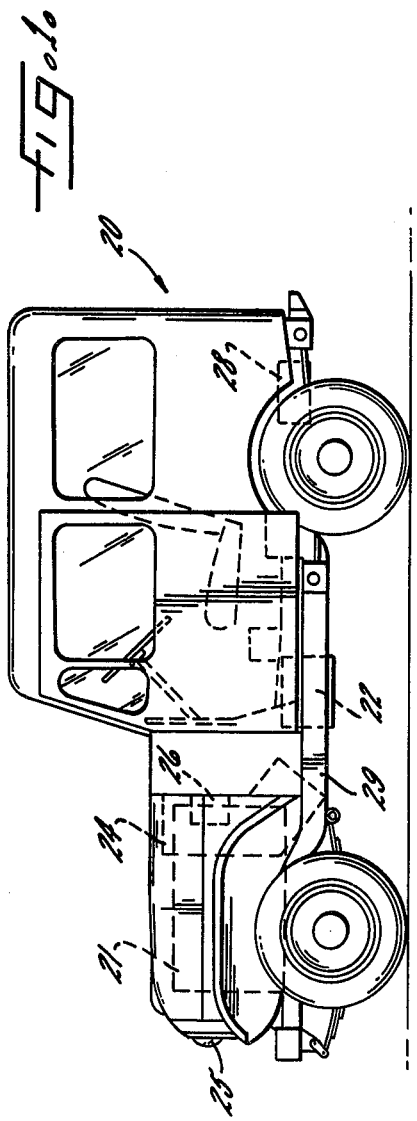
FIG. 1 is an illustration of an on the road vehicle equipped with an electrical propulsion system exemplifying the present invention.

Turning now to the drawings, and particularly to FIG. 1, there is shown a vehicle 20 arranged to be driven by an electrical propulsion system. The propulsion system is powered by a storage battery 21 situated in the location normally occupied by an internal combustion engine. The battery 21 is arranged to drive a motor 22 having a shaft coupled directly to the differential (not shown) of the vehicle. It will, however, be apparent that the particular form of mechanical coupling as well as the positioning of the elements in the vehicle may be modified without departing from the invention.

A controller 24 is provided for modulating the power delivered from the battery 21 to the motor 22 in accordance with the operating conditions of the vehicle as established by operator generated signals and external forces acting upon the vehicle. Operator generated signals include an acceleration signal related to the amount of depression of an accelerator pedal, a braking signal related to the amount of depression of a brake pedal, and direction selecting signals including forward, reverse and neutral. External forces acting on the vehicle include such factors as wind resistance and forces imposed by the grade upon which the vehicle is driving.

The illustrated vehicle 20 is intended for on the road use and, as such, requires certain accessory components such as headlights 25 and other normal accessory items. As the voltage of the propulsion battery 21 is preferably of a relatively high value, such as a nominal 54 volts, it is impractical to power the accessories from the propulsion battery. Accordingly, an accessory battery 26 is provided, in the form of a standard automotive battery having a nominal 12 volt output. If desired, the chassis 29 of the vehicle may be used as a ground return for the accessory battery. However, for reasons of safety, the propulsion battery 21 should be electrically isolated both from the chassis 29 and from the accessory battery 26.

Finally, means are provided for charging the propulsion battery 21, illustrated in FIG. 1 as onboard charger 28. As will become more apparent, according to one aspect of the invention, the onboard charger 28 (or its offboard counterpart, not shown) is adapted to be powered by a standard alternating current service to provide an unregulated d.c. voltage to the controller 24 for charging the propulsion battery 21.

Figure 2:
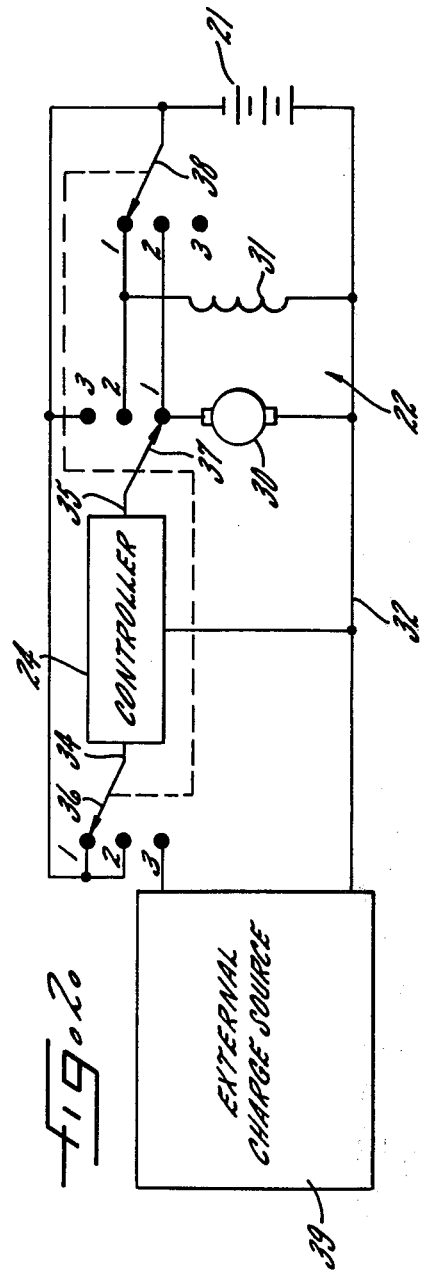
FIG. 2 is a block diagram of the propulsion system of FIG. 1 illustrating the time shared controller.
Figure 3B:
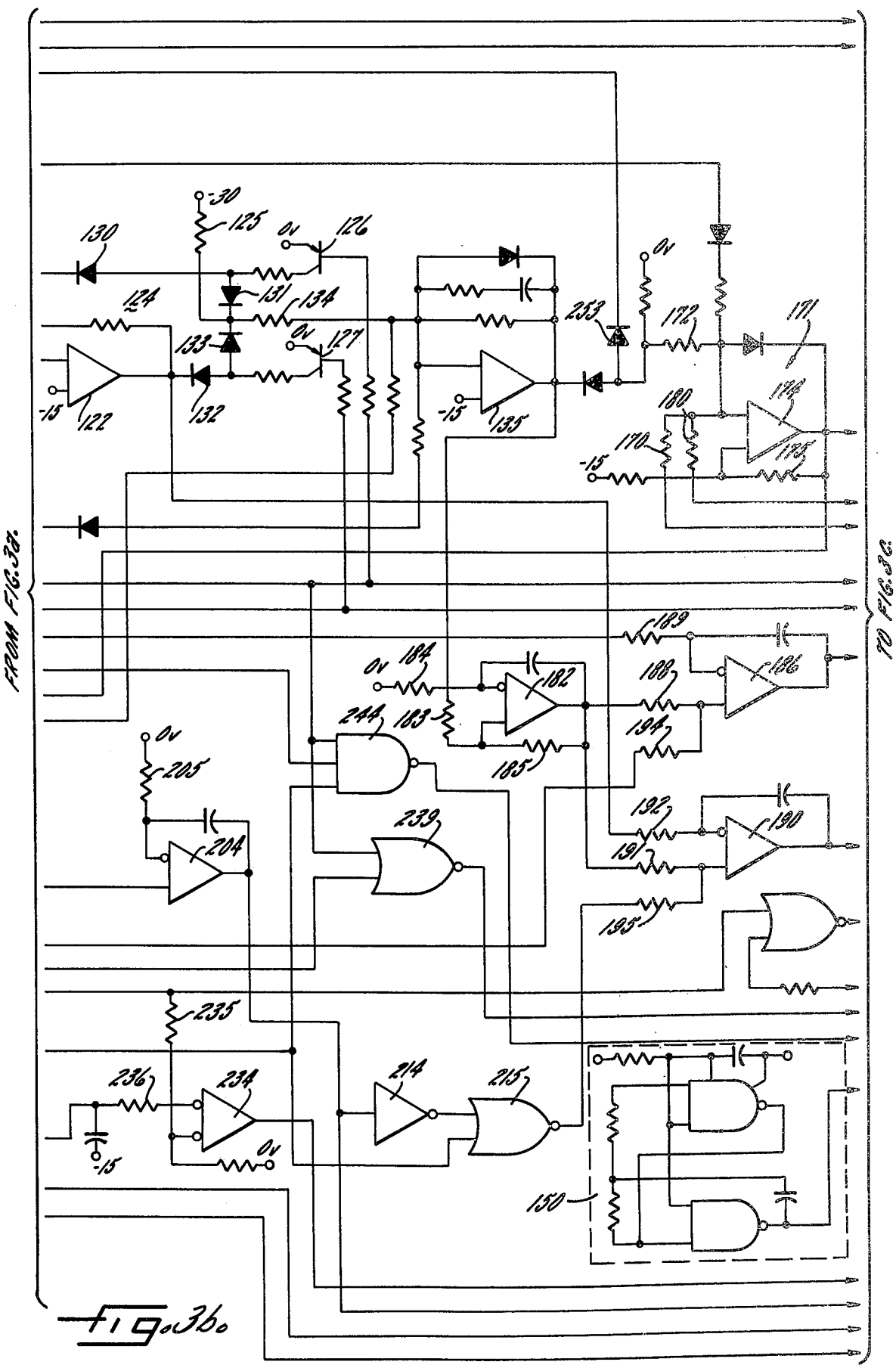
Figure 3D:
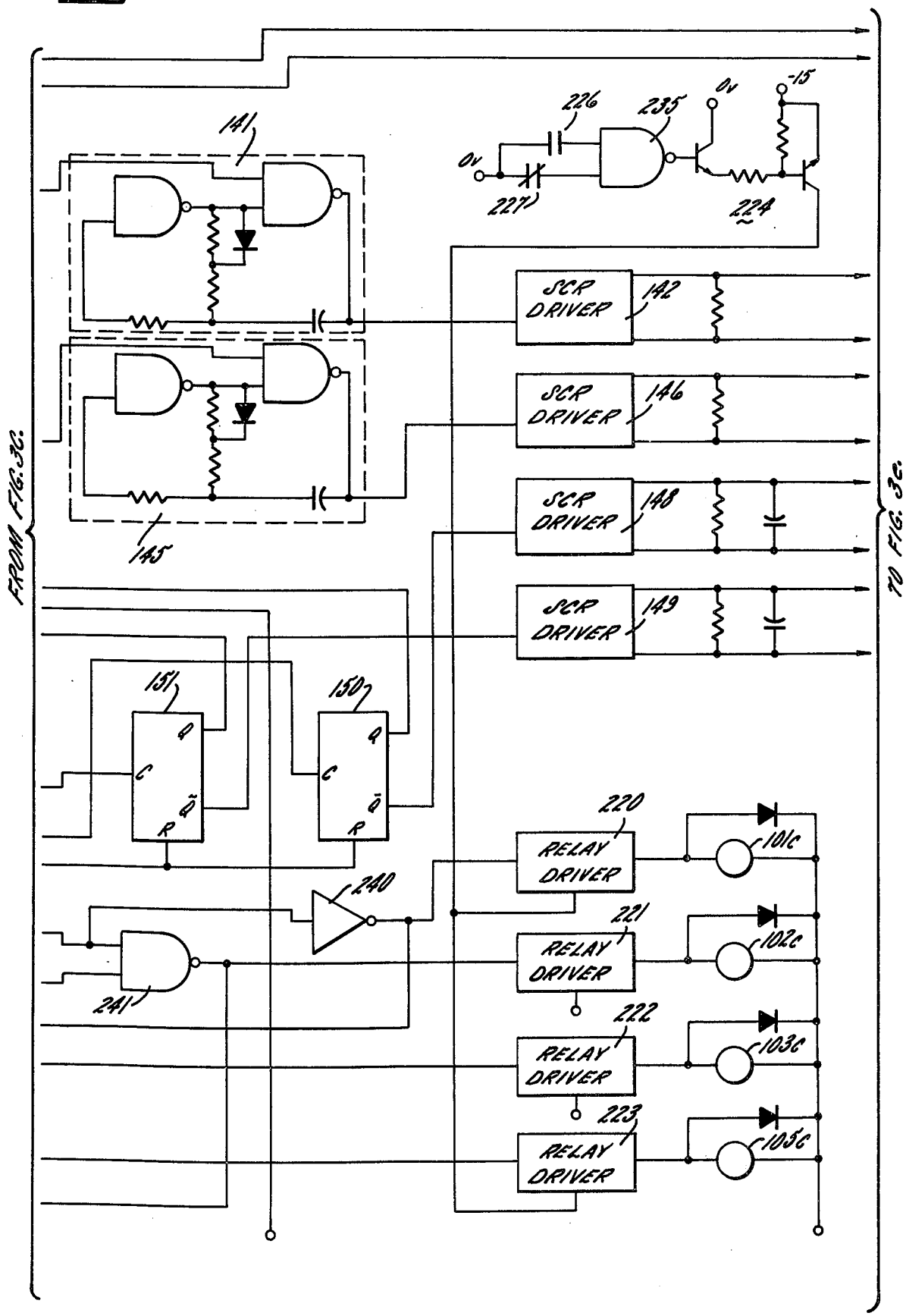

Turning now to FIG. 2, there is illustrated the functional interrelationship between the elements of the propulsion system shown in FIG. 1. The motor 22 is illustrated as a separately excited d.c. motor having an armature winding 30 and a shunt field winding 31. The propulsion battery 21 has its positive terminal connected to a common bus 22 and its negative terminal connected to switching means to be described below, while the controller 24 has both its input 34 and its output 35 coupled to the switching means.

The preferred form of the controller 24 will be described in more detail below. Suffice it to say for the moment that it comprises a proportional controller preferably having a linear characteristic and adapted to accept d.c. power on its input 34 for controlling the d.c. level on its output 35 for purposes which will shortly become apparent.

The aforementioned switching means is illustrated in FIG. 2 as an arrangement of three ganged switches 36, 37 and 38. Such switches, which may be referred to as mode selector switches, are each provided with three positions for establishing the three operational modes of the controller, namely, an armature control mode, a field control mode and a charge mode. Switches 36–38, when set in position 1 as shown in FIG. 2, establish the armature control mode. In such mode the propulsion battery 21 is coupled via switch 38 directly across the motor field 31. The controller 24 is interposed between the propulsion battery 21 and the motor armature 30 via switches 36 and 37. Accordingly, the controller 24 is adapted to modulate the power delivered to the armature while full voltage is applied to the field. It will be appreciated that such condition delivers maximum torque per amp and is, therefore, well adapted to driving the vehicle in a low speed range. At standstill the output of the controller will be at 0 volts thus leaving the motor at rest. In response to an operator generated signal demanding acceleration, the output voltage of the controller will be increased causing the motor to begin to rotate and to accelerate, if demanded, until the output of the controller reaches full battery voltage at which point the maximum speed in the armature control mode is attained.

The field control mode is established by causing switches 36–38 to assume position 2. In this condition the propulsion battery 21 is coupled directly across the armature 30 via the second level of switch 38, while the controller 24 is interposed between the propulsion battery and the field via the second levels of switches 36 and 37. In such condition, decreasing of the ouput voltage of the controller serves to further increase the speed of the motor, such operation generally being referred to as field weakening. As the output voltage of the controller decreases, motor speed further increases to generate the necessary back EMF to balance the full voltage applied to the armature.

The arrangement described thus far is advantageously used in the propulsion system according to the present invention in that only a single controller is needed for providing two modes of motor operation. In the low speed mode maximum torque per amp is achieved in order to effectively accelerate the vehicle. In the high speed mode, efficiency is enhanced because the propulsion battery is coupled directly to the armature eliminating any controller losses which would result were a controller left in the circuit between the battery and armature. It will be appreciated that in a separately excited dc. motor the current drawn by the motor is divided disproportionately between the armature and field, with by far the greatest proportion passing through the armature. Thus, the elimination of the controller losses from the armature circuit greatly enhances the efficiency of the propulsion system.

In accordance with an important aspect of the invention, mode switching is allowed only under predetermined operating conditions so that stress upon the switching elements is greatly reduced. More specifically, transfer of the switching means between the armature and field modes, is allowed only when the controller is full on. In such condition the output 35 of the controller 24 is at substantially the same voltage as the propulsion battery, only a slight voltage drop being introduced by the controller losses. Thus, when switches 36-38 are moved from position 1 to position 2 the only voltage difference seen across such switches is the voltage attributable to the controller losses. It should be noted that the schematic illustration of the switches in FIG. 2 requires a make before brake operation to achieve such effect. Such operation is readily achieved by the preferred form of switching means to be described with respect to FIGS. 3a –3e.

Referring in detail to the switching between positions 1 and 2, it is seen that switch 36 simply continues to provide input power to the controller. The armature 30, which is at substantially the voltage of the propulsion battery due to the fact that the controller 24 is full on, has the full battery voltage imposed across it via switch 38. Similarly, the field 31, which had been at full battery voltage via the position 1 of switch 38, has the output of the controller switched thereto, such output being at substantially full battery voltage. Thus, the voltages seen by the motor elements immediately before and immediately after switching are substantially identical. A first effect of such an arrangement is that speed changing is accomplished in a continuous manner rather than in a stepwise fashion characteristic of certain prior systems. Secondly, the fact that the switching elements are not required to break the high current inductive motor circuits, but simply transfer control from one full voltage element to the other, allows the employment of switching elements of materially less capacity than those used heretofore and causes a minimum of stress on those components. It will be appreciated that a contacter capable of breaking the high current armature circuit would be of a size considerably larger than one designed merely to carry that current.

According to a further feature of the invention, the switch means 36–38 and the controller 24 are adapted to operate in a charging mode for recharging the propulsion battery 21. Such mode is established by moving each of switches 36–38 to position 3 wherein the controller output 35 is coupled to the propulsion battery 21. An external charging source 39, coupled between the common bus 32 and the input 34 of the controller 24 via switch 36, supplies unregulated d.c. power to the controller. Such charging source may take the form of the onboard charger 28 illustrated in FIG. 1 or an offboard charger. In either case, the charger need only include a transformer and a rectifier, regulation being provided by the time shared controller 24. The elimination of a separate charging regulator greatly simplifies the nature of the external charger, as well as materially reducing its cost. The instant system also lends itself to multiple charging of a plurality of vehicles from a single d.c. bus. If a bus is provided of sufficient capacity, a plurality of vehicles may be coupled thereto, the controller of each vehicle regulating the charge for its respective battery independently of the condition of any other battery being charged from the bus.

In summary, it is seen that the capability provided by the mode switching means, allowing a single controller to be time shared in a plurality of modes, increases the practicality of the on the road battery propelled vehicle concept by providing continuous control, increased efficiency and reduced cost.

Efficiency is further enhanced by the particular form of controller illustrated in FIGS. 3a –3e, and particularly by the preferred form of power converter, namely the dual chopper. Single ended choppers have been used as power controls in battery propelled vehicles constructed heretofore. However, we have recognized that the use of a dual chopper as a load for a battery yields advantages in the minimization of internal battery losses. The power output of a chopper is modulated by varying the duty cycle thereof, which may be considered as the ratio of the output of the input voltage. If a single ended chopper and a dual chopper are driven from identical input voltages, for any demanded output voltage, the ratio of RMS to average current in the single ended chopper will always be higher than that ratio for the dual chopper. Realizing that the internal resistance of a battery source is not negligible and that the average current is a measure of the power delivered to the load, while the RMS current determines battery losses, the desirability of minimizing the RMS to average current ratio is appreciated. In a chopper circuit, the RMS and average currents are equal at 100% duty cycle and therefore their ratio is unity. However, at other duty cycles, as the pulse height remains relatively constant while the pulse width decreases, the ratio of RMS to average current increases with decreasing duty cycle. However, for any duty cycle except 100%, the RMS to average current ratio for a dual chopper is always less than that for a single ended chopper. Since the battery losses are dependent upon the square of the RMS current, it is seen that mimimizing this ratio serves to deliver maximum power within mimimum battery losses. Thus, the use of a dual chopper as a battery load is advantageous in that excessive power consumption within the battery is avoided and maximum power is deliverable by the battery to the load.

Referring to FIGS. 3a–3e, there is shown a circuit diagram operable in accordance with the principles discussed above, and forming a preferred embodiment of the invention. However, as will be apparent from the foregoing, the detailed embodiment is merely illustrative of the broader principles of the invention. It should also be noted that certain elements necessary for implementation of a practical circuit, but unnecessary for an understanding of the invention, do not appear on the circuit diagram of FIGS. 3a–3e. For example, snubbing components associated with the thyristors, thyristor biasing resistors and certain transient limiting elements have been eliminated in order to emphasize the inventive features, it being recognized, of course, that the application of elements such as these is well known to those skilled in the art. Similarly, the control portion of the circuit has been simplified by elimination of elements such as amplifier power connections and certain biasing and stabilizing circuitry.

Turning now to FIGS. 3a–3e, there is seen the propulsion battery 21 having its positive terminal coupled to the common bus 32. The negative terminal of the battery is coupled through fuses 40 to negative busses 41. The motor 22 includes an armature 30 and a shunt field 31 as described above. In a preferred form, the motor is a series stabilized separately excited configuration including a series field 33 arranged in series circuit configuration with the armature 30.

A shift tower assembly 42 is provided for allowing an operator to select either forward or reverse "gears" or neutral. In the neutral position switch 43 within the shift tower assembly breaks the common return for the shunt field 31 to open the field circuit during charging. In the neutral position the switch 44 provides a signal via connection 45 to the controller allowing it to operate in the charger mode if desired. When the shift tower is positioned in either the forward or reverse positions, line 45 is disabled thereby preventing the operation of the charger, and the common return for the shunt field 31 is completed via switch 43, thereby preparing the motor for operation. In the reverse position switch 46 is closed and similarly in the forward position switch 47 is closed. The signals provided by switches 46 and 47 produce an enabling signal for the controller, allowing the accelerator control to demand armature current. Additionally, the reverse position switch 46 energizes an interlock limiting the maximum speed in reverse.

Also responsive to the position of the shift tower assembly 42 is a transfer switch 50 comprising ganged contacts 51, 52 and 53. In the forward (upper) position, switch 51 couples power from the negative bus to the input of the chopper while switches 52 and 53 complete the circuit to the motor armature 30. In the reverse (lower) position, switch 51 provides power to the chopper while switches 52 and 53 complete the circuit to the armature but in the reverse direction. In the neutral position each of switches 51, 52 and 53 remain open breaking the path between the negative bus 41 and the controller via switch 51 and maintaining the motor armature out of the controller circuit.

Other operator accessible controls are the accelerator control generally illustrated at 55 and the brake control generally illustrated at 56. Such controls are preferably responsive to a standard accelerator and brake pedal respectively. The accelerator control 55 includes an accelerator switch 58 and an accelerator potentiometer 59. The switch 58 provides a signal to the controller for energizing certain of the drive or motoring relays to be described below. The potentiometer 59 provides a signal whose magnitude is dependent upon the amount of depression of the accelerator pedal for demanding a required amount of armature current. The brake control 56 is similarly constructed including a braking switch 60 and a braking potentiometer 61. The switch 60 provides a signal to the controller adapted to cause the sensing circuitry to switch from the acceleration to the braking mode. The potentiometer 61 provides a signal opposite in sense to the acceleration potentiometer and having a magnitude dependent upon the degree of depression of the brake pedal for demanding a required amount of reverse armature current in the regenerative braking mode.

The power modulator of the controller comprises a dual chopper generally illustrated at 70 including a pair of power SCRs 71, 72. The SCRs 71, 72 have their cathodes coupled via respective inductors 74-1, 75-1 to a negative motoring bus 76 which, as has been described above, is supplied with power from the propulsion battery via switch 51 when the shift tower assembly is in either the forward or reverse positions. The anodes of the SCRs 71, 72 are coupled via interphase transformer 77, illustrated as coils 78, 79, to the chopper output 80. The interphase transformer 77 serves to parallel the power pulses from the SCRs 71, 72 absorbing at any instant the difference between the direct voltages of the respective choppers for providing an average power output. The interphase transformer will be described in more detail below. As will become apparent, the inductors 74-1 and 75-1 are magnetically coupled to the commutating circuitry and function with respective commutating diodes 81, 82 to reverse bias the associated power SCRs 71, 72 for commutation. To summarize, in motoring power is delivered to the chopper via bus 76, the chopper SCRs are turned on via their gating circuits and commutated via the aforementioned inductors and commutating diodes to operate at a variable duty cycle to deliver the demanded voltage level via the interphase transformer 77 to the output bus 80.

Commutating energy for the chopper circuit is supplied by a commutating inverter generally indicated at 90. The commutating inverter, which bridges the positive negative busses, 32 and 41, respectively, includes a pair of SCRs 91, 92. The inverter is arranged in stacked or center tapped configuration with inductor 74-2 operatively associated with SCR 91 and inductor 75-2 operatively associated with SCR 92. The capacitors 93, 94 act together to resonate with the respective inductors, appearing to be in parallel for the high resonant frequencies because of the low power supply impedance for high frequencies provided by filter capacitor 97. The coils 74-2 and 75-2 form the primaries for the commutating inductors 74-1 and 75-1 interposed in the main chopper circuit. When, for example, SCR 71 in the chopper circuit is conducting, SCR 91 in the commutating inverter may be fired to turn SCR 71 off. Firing of SCR 91 causes a resonant exchange of energy between capacitors 93, 94 and primary coil 74-2 thereby discharging the capacitors and recharging them to the opposite polarity so as to self-commutate the inverter SCR 91. The turns ratio between inductor 74-2 and 74-1 is selected so that at the instant SCR 91 fires sufficient voltage is inducted in coil 74-1 to reverse bias SCR 71 in the chopper circuit. Thus, current flow in this chopper leg is interrupted allowing the chopper SCR 71 to commutate. SCR 92 in the commutating inverter and SCR 72 in the chopper cooperate in a similar manner.

It will be appreciated that the circuit of the commutating inverter has very low losses. Indeed, it has been found that under certain circumstances the chopper actually transfers energy to the inverter. As a result of the low losses, the voltage across the resonating capacitors 93, 94 will tend to increase in magnitude for each cycle of the commutating inverter. For example, assume that the junction between between capacitors 93 and 94 is initially at one-half the voltage of the propulsion battery before the commutating SCR is fired. When SCR 91 is fired, a resonant exhange of energy occurs between capacitors 93, 94 and commutating inverter windings 74-2 reversing the charge on the capacitors to self-commutate SCR 91. Thus, after SCR 91 commutates the voltage at the junction is at approximately three halves the battery voltage above the common bus 32. When SCR 92 fires to set up a resonant exchange of energy between capacitors 93, 94 and commutating inverter winding 75-2, current also flows from the power busses through capacitor 93 which causes the voltage across the capacitor to ring the positive direction until it is approximately five halves battery voltage below the common bus 32. Thus, for each half cycle of the commutating inverter, energy is removed from the battery and because of the relatively low losses in the inverter circuit the voltage across the commutating capacitors is increased by an amount approximately equal to battery potential. If this were allowed to go unchecked, the voltage would raise to the point where the circuit elements would be destroyed. To prevent such occurrence, means are provided for returning excess energy from the commutating inverter circuit to the propulsion battery. To that end, each of the commutating reactors is provided with a clamp winding 74-3 and 75-3 respectively. Such windings are coupled in series with respective clamping diodes 95, 96 across the propulsion battery bus. The windings are phased and the turns ratio selected such that windings 74-3 or 75-3 forward bias their respective diodes 95, 96 to return power to the propulsion battery at a point when the capacitors 93 or 94 have been charged with sufficient energy for the next commutating cycle.

The means for gating the chopper SCRs and the commutating inverter SCRs will be described in detail below. Suffice it to say for the present that such SCRs are gated in a manner which allows the duty cycle of the chopper to be varied from full off to full on in a continuous manner. Thus, the chopper may be controlled to vary the voltage at its output 80 from zero voltage to substantially the full voltage of the propulsion battery (less chopper losses).

In accordance with an important aspect of the invention, and in a manner corresponding to the functional description set forth above, mode switching means are provided for time sharing the chopper 70 between the armature control mode and the field control mode in a manner which provides minimum stress on the mode switching elements. The power portion of the mode switching means, generally indicated at 100 includes a plurality of switching means 101 through 104. Closing of contacts 101 and 102 in the mode switching means serves to establish the armature control mode. In such mode the motor field 31 is coupled directly across the battery via contacts 101. Similarly, the chopper is interposed between the battery and the motor armature 30 via contacts 102. Since no voltage appears at the output of the controller (0% duty cycle) when the armature mode is engaged, contacts 102 may close without being subject to a high current surge. Contacts 101 switch the propulsion battery voltage directly to the shunt field. However, as the shunt field is a relatively high impedance, the contacts are not subject to a great current surge. Once the armature mode is engaged, if armature current is demanded, the duty cycle of the chopper will advance, raising the voltage across the armature of the motor. The duty cycle will continue to advance as long as additional armature current is demanded until a condition is reached when the chopper is full on. At that point, substantially full propulsion battery voltage is being applied to the armature through the controller while full propulsion battery voltage is maintained on the field via contacts 101. As will be described below, the control portion of the circuit senses such condition and if additional armature current is demanded such circuit causes a shift to the field control mode. Such shift is accomplished by closing contacts 103 for the purpose of providing full battery voltage to the armature. Since the controller is producing substantially full battery voltage, there is a negligble voltage drop across contacts 103 as they are closed. Thus the current surge through contacts 103 is minimized. Diode 104 serves as the switching means for coupling the motor field to the output of the controller so that the field control mode may be established. It is apparent that such diode may be replaced by a set of contacts, if desired. After contacts 103 are closed and before contacts 102 are opened, the full propulsion battery voltage is present on both the anode and cathode of diode 104. The second phase of the mode switching operation includes opening of contacts 101 and 102. As the controller is at full output it will be appreciated that such contacts may now be opened without breaking the armature or field circuits, since they are being maintained via switching means 103 and 104. It will be appreciated that at the point of switching there may be several hundred amps flowing in the armature circuit; interrupting a current of that magnitude would require a contacter of considerable capacity. After the mode switching operation, full battery voltage is applied to the armature via contacts 103, thereby removing all controller losses from the high current armature circuit. The chopper 70 has its output coupled via switching means 104 to the shunt field 31. If further armature current is demanded, the duty cycle of the chopper is retarded in order to allow the motor to further accelerate in response to the weakening of the shunt field. The duty cycle of the chopper is reduced until the chopper is substantially off at which point the motor speed is at a maximum.

The elements of the circuitry for producing a duty cycle control signal will now be described. Initially, it is seen that the brake potentiometer 61 and the acceleration potentiometer 59 have their respective wipers coupled to a switching circuit 110 comprising transistors 111 and 112. The switching circuit is, in turn, controlled by the shift tower assembly, and specifically by switches 46 and 47 therein.

Accordingly, when the shift tower assembly is in the neutral position, transistor 112 is clamped on by current through resistor 119, while transistor 111 is caused to conduct in response to the high output of an inverter 113. However, when either the forward or reverse position is selected, the signal provided by switch 46 or 47 drives the output of the inverter 113 low (to negative 15 volts) switching transistor 111 off. The signal provided by the switches 46 or 47 is also coupled through resistors 114 and 115, raising the voltage at the base of transistor 112 causing it to turn off. It is seen that the signals from the braking potentiometer wiper and the acceleration potentiometer wiper are coupled through respective resistors 116, 117 to the input of a summing junction at the inverting input of amplifier 118. As will become more apparent, the acceleration and braking signals provided via the switching means 110 serve to demand a given amount of armature current. Since such signals are opposite in sense (with respect to the negative 15 volt bus) the acceleration signal serves to demand a positive armature current while the braking signal serves to demand a negative armature current for use in regenerative braking. It is further seen that if the brake pedal is depressed, the output of inverter 200 will be driven low, sinking current through diode 201 to turn transistor 112 on, shorting any acceleration signal to the negative 15 volt bus.

To provide a signal indicative of the actual armature current a differential amplifier 120 is provided with its inputs coupled across the armature shunt 106. The amplifier 120 is biased such that the output voltage thereof is an accurate indication of the amount of current actually flowing in the armature. Further, the output is driven positively with respect to a reference (such as negative 15 volts) for positive values of armature current and negatively with respect to that reference for reverse armature current. The output of amplifier 120 is coupled to the aforementioned summing junction via a resistor 121. Accordingly, a signal indicative of the actual armature current is summed with a signal representing the demanded armature current allowing amplifier 118 to compare such signals for producing a control signal for maintaining the actual armature current at the demanded level.

Recalling that in the armature mode a demand for increased armature current requires an advance in the duty cycle of the chopper while in the field control mode a similar demand requires a decrease in the duty cycle, it will be appreciated that the control signal must achieve opposite effects in the respective modes. Accordingly, an inverted control signal is produced by an amplifier 122 biased for unity gain, and having the control signal coupled to its inverting input.

For selecting the control signal or inverted control signal in dependence upon the operating mode, a steering circuit generally indicated at 124 is provided. Negative bias is coupled to the steering circuit via resistor 125, while positive bias is selectively coupled to such circuit via switching transistor 126, 127. The transistors 126, 127 have their bases coupled to the Q and $\overline{Q}$ output respectively of a mode control flip-flop 129. While the mode control flip-flop 129 will be described in more detail below, suffice it to say for the moment that in the armature control mode the Q output is low and $\overline{Q}$ high, with the opposite condition existing in the field control mode. Thus, when the mode control flip-flop is in the armature control mode, the negative voltage at the Q output forward biases the base emitter of transistor 126 thereby providing positive bias to diodes 130, 131. Similarly, the $\overline{Q}$ output being at approximately 0 volts reverse biases the base emitter of transistor 127 preventing the application of biasing voltage to the diodes 132, 133. In this condition the control signal produced by comparator means 118 passes through the steering circuit and through resistor 134 to a summing junction at the inverting input of amplifier 135. Alternatively, in the field control mode, transistor 126 is cut off removing the biasing potential from diodes 130, 131, while transistor 127 provides biasing potential to diodes 132, 133, allowing the inverted control signal to pass through the resistor 134 to the summing junction at the input of amplifier 135.

To summarize thus far, whenever positive armature current is demanded the control signal at the output of amplifier 118 will be driven positively from its quiescent reference. Similarly, the inverted control signal at the output of unity gain amplifier 122 will be driven negatively from its quiescent reference. If the circuit is operating in the armature control mode, the control signal will be passed through diodes 130 and 131 providing a positive signal to the summing junction at the input of amplifier 135, and serving to advance the duty cycle for increasing levels thereof. Under these same conditions, however, in the field control mode, the negative signal will be coupled via diodes 132 and 133 to the input of the summing junction, serving to retard the duty cycle for decreasing levels thereof. Of course, it will now be apparent that both of these conditions will operate to increase the rotational speed of the motor.

Neglecting for the moment the remaining inputs to the summing junction at the inverting input of amplifier 135, it will be seen that the output signal of such amplifier is driven negatively with respect to a reference to increase the duty cycle and positively with respect to such reference to retard the duty cycle. Such signal forms a control input to the duty cycle control circuitry which functions to generate gating signals for the SCRs in the chopper and those in the commutating inverter. It should be noted that the illustrated duty cycle control is described in greater detail in our patent application Ser. No. 548,912 filed concurrently herewith entitled Power Converter and assigned to the same assignee as the present invention. It is also stressed that while the illustrated form of duty cycle control is preferred, other arrangements may be used without departing from the spirit and scope of the present invention.

The duty cycle and triggering circuits will be best understood by referring initially to the output portions thereof. A flip-flop 140 is provided having its output coupled to a burst pulse generator 141 which in turn powers a gate pulse amplifier 142 for generating a gating signal for SCR 71. A similar arrangement including flip-flop 144, a burst pulse generator 145, and a gate pulse amplifier 146 is provided for triggering SCR 72. The burst pulse generators 141, 145 are adapted to produce a series of pulses in response to a signal from their associated flip-flop. Use of burst firing techniques is preferable to assure reliable turn on in thyristor circuits where the load may vary, as in the case of the instant chopper. Recognizing that the use of a burst pulse generator for generating a series of spaced gating pulses is not new to those skilled in the art, we have not attempted to provide a detailed description of the burst pulse generator, itself. At the same time, it will be recognized that other conventional gating techniques could be used, if desired. Referring back to the drawings, the output of the respective burst pulse generators are coupled to associated gating drivers which also have been shown only diagrammatically since it is contemplated that they be conventional in form. Such drivers operate to produce gate pulses sufficient in amplitude and energy for triggering the SCRs to which they are coupled. In this regard, we find it preferable to use inductive coupling between the drivers and the gates of the respective SCRs.

For gating the SCRs in the commutating inverter, a similar pair of gating drivers 148, 149 is provided. Such drivers have inputs coupled to the outputs of flip-flops 150, 151 respectively. It is noted that burst firing techniques are not employed for the commutating SCRs since their load is known. In the illustrated embodiment, the duty cycle of the chopper is controlled in a digital manner. Initially, it should be noted that the commutating inverter is driven at a constant frequency while the duty cycle of the chopper is varied by adjusting the phase of the chopper firing with respect to the fixed frequency of the commutating inverter.

For providing a time base for the gating circuitry, an oscillator 150 has it pulse output coupled to the clock input of a counter 151 and a similar delayed counter 152. The delayed counter 152 is normally maintained in its reset state by a flip-flop 153. The counter 151 is continually allowed to cycle, having its most significant bit output 154 coupled directly to the clock input of flip-flop 151, and via an inverter 155 to the clock input of clock flip-flop 150. As the counter 151 is continually allowed to recycle, the waveform at the most significant bit output 154 will be a square wave. At the rising edge of the square wave flip-flop 151 will be triggered, thus driving SCR 92 into conduction. Similarly, at the falling edge of the square wave flip-flop 150 will be triggered, via inverter 155, thus driving SCR 91 into conduction. A NAND gate 156 and inverter 157 are provided to reset both of flip-flops 150 and 151 after the counter 151 has recycled to a relatively low count thus removing the gate signal from the commutating SCRs. In summary, it is seen that the SCRs in the commutating inverter are alternately triggered at the termination of each cycle of the counter 151 so as to drive the commutating inverter at a fixed frequency.

For relating the aforementioned control signal produced by amplifier 135 to the digital signals within the duty cycle control circuit, a digital-to-analog converter 160, comprising an array of digitally weighted resistors coupled to a summing junction at the inverting input of an amplifier 168, is provided to produce an analog waveform corresponding to the count within the counter 151. Accordingly, the output of amplifier 168 takes the form of an inverted sawtooth ramping downward with increasing count of the counter 151 and resetting to a reference level at the time the counter is recycled. Such sawtooth signal is coupled via resistor 170 to a summing junction at the inverting input of an amplifier 174 within a phase delay comparator 171. The duty cycle control signal from the output of amplifier 135 is similarly coupled via a resistor 172 to the summing junction. When the duty cycle control signal at the output of amplifier 135 is at its quiescent level, indicating that the chopper is to remain off, the sawtooth waveform coupled through resistor 170 has no effect on the output of amplifier 174. However, when the duty cycle control signal is driven negatively from its quiescent value, at some point on the sawtooth wave, depending upon the magnitude of the negative signal from amplifier 135, the summed signals will cause the output of amplifier 174 to become positive. Realizing that resistor 175 provides positive feedback around the amplifier 174, the amplifier output will switch to the positive condition until reset. The output of the phase delay comparator being driven to a positive level serves to set flip-flop 140 thus energizing burst pulse generator 141 to trigger SCR 71 in the chopper. The $\overline{Q}$ output of flip-flop 140 is coupled back to the reset input of flip-flop 153, thus resetting flip-flop 153 and serving to remove the reset signal from delayed counter 152. The delayed counter 152, having its clock paralleled with the clock of counter 151 is thus driven in synchronism with the counter 151. However, the count within counter 152 is less than that within counter 151 by an amount dependent upon the delay between the firing of SCR 92 (on the previous half cycle of the commutating inverter) and the firing of SCR 71. When the counter 151 fills, the output thereof causes flip-flop 150 to be clocked thereby triggering SCR 91 to commutate SCR 71. Counter 151 recycles to begin counting from zero. However, counter 152 continues to count upward in synchronism with the counter 151. When counter 152 fills, it produces an output signal on the most significant bit output 176 which is coupled to the set input of flip-flop 144. Accordingly, flip-flop 144 is set energizing the burst pulse generator 145 to act through SCR driver 146 to gate SCR 72. It will be appreciated that the length of time elapsed between the firing of SCR 91 and the firing of SCR 72 is identical to the time elapsed between the firing of SCR 92 and SCR 71. The setting of flip-flop 144 to fire SCR 72 also serves to set flip-flop 153 to again impose a reset signal upon the delayed counter 152. Thus, the delayed counter is again prepared to respond to begin counting the delayed cycle for firing SCR 72 when flip-flop 153 removes the reset signal. Since the frequency of the oscillator 150 is relatively high, for example 500 kHz, and since the number of stages in the counters 151 and 152 is somewhat large, such as ten binary stages, the chopper may be run at a basic frequency of approximately 500 kHz while sufficient resolution is provided in the duty cycle control circuit to maintain the duty cycle of the two halves of the chopper precisely equal. This feature is important when using an interphase transformer of the type to be described below, because it maintains the average d.c. outputs of the two halves of the chopper precisely equal, eliminating any average d.c. current through the interphase transformer.

If it is desired to provide separate inductors at the output of the dual chopper for combining the waves of the two halves of the chopper, then the d.c. component through the two inductors becomes less important and other conventional duty cycle controls may be employed.

The Q output of flip-flop 150 is coupled back to the summing junction of the phase delay comparator 171 through a resistor 180. Accordingly, when flip-flop 150 is clocked to fire SCR 91, the signal provided through resistor 180 serves to sink sufficient current from the summing junction at the input of amplifier 174 to overcome the positive feedback through resistor 175 and return the output thereof to a low level. Thus the phase delay comparator 171 is again armed to respond to the ramp signal and the duty cycle control signal.

In summary, duty cycle operation takes place substantially as follows: the commutating inverter operates at a fixed frequency established by the oscillator 150 and the counter 151. The firing of SCR 91 serve to enable the phase delay comparator 171 to compare the duty cycle control signal with the ramp voltage produced by the D/A converter 160. The duty cycle control signal, when summed with the ramp voltage will cause the phase delay comparator 171 to drive its output high at some point in the ramp signal. This action causes the triggering of SCR 71 to fire the first half of the chopper, and removes the signal from the delayed counter 152 to begin timing the period for firing of the second half of the chopper. SCR 91 will be fired at its appointed time commutating SCR 71. Counter 151 will recycle but delayed counter 152 will continue to count up until it is full, at which point it will fire SCR 72 so as to initiate the second half cycle of chopper operation. Firing of SCR 72 serves to reset the delayed counter, arming it for its next cycle. At its appointed time, SCR 92 will fire commutating SCR 72 and again allowing the duty cycle control signal to be compared with the ramp signal from the D/A converter for initiating the next cycle of chopper operation. It is seen that the more negative the duty cycle control signal becomes, the earlier in the ramp signal the phase delay comparator will switch, thus advancing the duty cycle of the chopper. Such action continues until the duty cycle control signal from amplifier 135 causes the chopper to approach 100% duty cycle, at which point the output voltage of the chopper is at a maximum.

Mode switching circuitry is provided for controlling the mode control flip-flop 129 in order to establish the armature and field control modes, and to switch between said modes at appropriate times. In the preferred embodiment of FIG. 3, the mode switching circuitry utilizes amplifiers known as the Norton type, commercially available from National Semiconductor and identified as their part No. LM3900N. Such amplifiers are current controlled devices having a pair of inputs for controlling a single ended output. In the illustration, the lower input, which may be regarded as a non-inverting input, serves to drive the output voltage higher in response to increasing current flow into such input. By way of contrast, the upper input, designated with a zero, serves to drive the ouput lower with increasing current into such input.

Turning now to the illustrated embodiment of the mode switching means, there is shown an amplifier 182 having its non-inverting input coupled via a resistor 183 to the output of amplifier 135 which, it is recalled, carries the duty cycle control signal. The inverting input of amplifier 182 is coupled via a resistor 184 to the zero voltage bus. When the amplifier 135 is producing a duty cycle control signal demanding less than 100% duty cycle, the relationship between the values of resistors 183 and 184 causes the output of the amplifier 182 to be maintained at a positive level. When the output level of amplifier 185 is at a level causing the duty cycle to be 100%, the current drawn through resistor 183 negates the regenerative feedback from resistor 185 and drives the output of the amplifier 182 negatively. This negative level is transmitted to the non-inverting input of amplifier 186 via resistor 188 and arms such amplifier to sense the need for a mode change from the armature control mode to the field control mode. It is seen that the inverting input of amplifier 186 is coupled through a resistor 189 to the control signal produced by amplifier 118. If the signal produced by the amplifier 118 continues to rise, indicating that still more armature current is demanded, current is supplied through resistor 189 sufficient to cause the output of amplifier 186 to switch to a low level. This low level signal, applied to the set input of mode control flip-flop 129, serves to set the flip-flop, driving the Q output thereof high and its $\overline{Q}$ output low. As described fully above, such occurrence acts upon the biasing transistors in the steering circuit to prevent the control signal from being coupled through the steering circuit while allowing the inverted control signal to be coupled through such steering circuit. Accordingly, a demand for additional armature current then reduces the duty cycle of the chopper, weakening the motor field to further increase the motor speed.

A similar cycle takes place if the operator removes his foot from the accelerator pedal in the field control mode. In that event, the armature current is greater than the demanded current, and the inverted control signal from amplifier 122, coupled through the steering circuit will serve to increase the duty cycle. When the duty cycle is increased to 100%, the output of amplifier 182 will be driven negatively as described above. This negative signal being coupled to the non-inverting input of amplifier 190 via resistor 191 arms amplifier 190 to perform a mode switching operation. The inverting input of the amplifier 190 is coupled via a resistor 192 to the inverted control signal produced by amplifier 122. Thus, if the control signal is positive, indicating that the armature current is greater than the demanded current, the output of amplifier 190 will be driven low, providing a reset signal to the input of mode control flip-flop 129. Thus the mode control flip-flop will be returned to the armature control mode. It is important to note that due to the presence of the amplifier 182 for arming the mode switching means, under the conditions described mode switching can occur only when the duty cycle of the chopper is at 100%. The importance of this feature in protecting the power switching elements has been emphasized above.

It is seen that each of the non-inverting inputs of the amplifiers 186 and 190 are provided with a second signal. The amplifier 186 is provided with a signal through resistor 194 which is coupled to the reverse switch 46 in the shift tower assembly 42. Thus, if the reverse direction is selected a positive signal is coupled through resistor 194 which prevents amplifier 186 from responding to the signal from amplifier 118 thus locking the circuitry into the armature control mode during reversing. Thus, maximum speed in the reverse direction is limited. A resistor 195 is coupled to the non-inverting input of amplifier 190 for use in the regenerative braking mode.

It will be appreciated that the circuitry utilized for establishing the duty cycle of the chopper is entirely current controlled in its sensing aspect and responds directly and accurately to the actual current in the armature. The feedback system thus provided causes the control signal at the output of the summer 118 (or the inverted control signal at the output of unity gain amplifier 122) to be maintained at the voltage required to establish a duty cycle wherein the actual armature current corresponds to the amount of armature current demanded by the position of the acceleration potentiometer 59. Any deviation in the actual current or in the demanded current will adjust the duty cycle to again, bring the actual and demanded currents into concurrence. Similarly, when the circuitry senses that the duty cycle is at a maximum, the comparison circuitry must still sense an additional difference between the actual current and demanded current before causing a mode switching operation. This slight amount of hysteresis incorporated into the system eliminates unnecessary switching between modes.

In accordance with one aspect of the invention, system efficiency is enhanced by utilizing regenerative braking techniques in stopping the vehicle. Initially, it should be mentioned that the vehicle is equipped with a normal hydraulic braking system. However, in the upper portion of the speed range, the regenerative braking effect achieved by operating the motor 22 as a generator produces large amounts of braking horsepower, and also serves to return considerable energy to the battery. In the instant system, regenerative braking is used only in the field control mode wherein the armature is coupled directly across the battery. When braking is demanded, the forward momentum of the vehicle serves to drive the motor, causing the motor to act as a generator, reversing the direction of armature current and returning power to the battery. As the kinetic energy of the vehicle is proportional to the square of its velocity, it is seen that three quarters of the kinetic energy is contained in the top half of the speed band. Thus, regenerative braking is used in the area where it can achieve the greatest effect.

Regenerative braking is initiated by depression of the brake pedal which closes braking switch 60. The switch 60 thus couples a positive signal to the input of an inverter 200, driving its output low. The low output from inverter 200 forward biases diode 201, causes current flow in the base-emitter circuit of transistor 112, causing it is conduct. The emitter collector circuit of transistor 112 clamps the acceleration signal to the negative 15 volt bus. The signal from the brake potentiometer 61 is, however, coupled to the summing junction at the input of amplifier 118. Since this signal is opposite in sense to the acceleration signal discussed above, it serves to demand reverse armature current. Assuming that the motor is in the field control mode, it will be apparent that the resulting negative signal produced at the output of the amplifier 118 in response to a braking demand signal from potentiometer 61 will serve to advance the duty cycle of the chopper so that the armature, being driven as a generator, may produce the demanded reverse current and return such current to the battery.

For deriving the maximum effect from regenerative braking, means are provided for locking the controller in the field control mode until the braking effect falls below a predetermined minimum, at which point the controller is allowed to switch modes. Accordingly, a NOR gate 215 has a first input coupled to the output of inverter 200 so that such input is driven low in response to the closing of the brake switch 60. As will shortly become apparent, the output of inverter 214 will couple a low signal to second input of NOR gate 215, driving its output high, thereby driving current through resistor 195 to the non-inverting input of amplifier 190. The output of amplifer 190 will thus be maintained at a high level in which condition it is incapable of switching mode control flip-flop 129 to the armature mode.

For causing the mode control flip-flop to return to the armature control mode, means are provided detecting the point at which armature current falls below a predetermined minimum and causing a mode switching operation at that point. To that end, amplifier 204 has its inverting input positively biased via resistor 205 and has its non-inverting input coupled to a junction formed by a pair of resistors 206, 207. The resistors in turn are driven by a pair of amplifiers 208, 209 respectively. In addition to the biasing components associated with the input of amplifier 208, the input thereof is coupled via resistor 210 to the output of amplifier 120 which, it is recalled, provides a voltage indicative of the current in the motor armature. Similarly, the biasing elements of amplifier 209 include resistor 211, also coupled to the output of amplifier 120. In the regenerative braking mode, at currents greater than a predetermined level, selected herein as 60 amps, the negative output signal from amplifier 120 draws sufficient current through resistor 210 to drive the output of amplifier 208 to a high level. Such high signal is coupled through resistor 206 to the non-inverting input of amplifier 204 maintaining the output thereof at a high level. This high signal is coupled to the input of inverter 214 which, in turn, has its output coupled to the input of NOR gate 215. Thus, with braking currents greater than 60 amps the output of NOR gate 215 is maintained at a high level, such level acting through resistor 195 to prevent amplifier 190 from returning the mode control flip-flop 129 to the armature control mode. However, when the reverse armature current falls below 60 amps the current through resistor 210 is reduced thus driving the output of amplifier 209 low which, in turn, drives the output amplifier 204 low. This low signal acts through the inverter 214 and NOR gate 215 to remove the lock out signal from amplifier 190, thereby allowing it to return the mode control flip-flop to the armature mode. Thus, when regenerative braking current falls to a relatively low level such as 60 amps, a point at which the effect thereof is negligible, the circuit is recycled to terminate regenerative braking and prepare for further acceleration.

Referring again to the minimum current level sensor, it is seen that amplifier 209 is adapted to sense levels of armature current in the positive direction less than a predetermined minimum, such as 60 amps. The positive signal provided by amplifier 120 in response to positive armature current exceeding the minimum causes sufficient current flow through resistor 211 to drive the output of amplifier 209 high. Just as the high signal from amplifier 208, the high signal from amplifier 209 will maintain the output of amplifier 204 at a high level. Thus, a high level produced by amplifier 204 indicates that the current in the armature is greater than 60 amps, independently of the direction thereof, (positive as in motor driving and negative as in regenerative braking). When positive current falls below the predetermined minimum, the output voltage of amplifier 120 reduces the current flow through resistor 211, causing the output of amplifier 209 to shift to a low level. This low signal is coupled to the non-inverting input of amplifier 204, driving its output low. It will therefore be apparent that the low condition of the output of amplifier 204 indicates that armature current is below 60 amps, irrespective of the direction of armature current flow. It should be noted that the high signal produced by amplifier 204 in response to positive armature current greater than 60 amps has no effect on the mode control flip-flop because the released condition of the brake switch 60 causes the output of inverter 200 to be at a high level, such high signal acting through NOR gate 215 to maintain the output thereof at a low level. The minimum current sensing in the motor driving condition is, however, useful in controlling the mode switching contactors as will be now described.

The effect of the switching contacts 101, 102, and 103, has been described above. Additionally, contacts 105 are interposed in the armature circuit for providing a safety feature, opening of the "ignition switch" causing contacts 105 to open. The control coils for said contacts 101C, 102C, 103C and 105C are controlled by logic circuitry acting through respective relay drivers 220 through 223. Drivers 220 and 223 are provided with an enabling ground return via a biasing circuit 224 driven by a NAND gate 225. The NAND gate has a first input coupled via contacts 226 to the zero voltage bus. Such contacts are responsive to the actuation of a key switch adapted to energize the vehicle for motoring. The second input of the NAND gate 225 is coupled to the zero voltage bus by contacts 227, which are normally closed except when the connection of a propulsion battery charger is sensed by circuitry (not illustrated). It is within the scope of the art to sense the connection of a plug and to open contacts 227 when the presence of such plug is sensed. In accordance with the arrangement described above, the output of NAND gate 225 is driven to a low level whenever no charger is connected and the key switch is actuated. Under this condition, a biasing circuit 224 provides an enabling ground return for relay drivers 220 and 223. By way of contrast, relay drivers 221 and 222 are coupled directly to a return path. Thus, drivers 221 and 222 operate irrespective of the charging or motoring mode, while drivers 220 and 223 are allowed to operate only in the motoring mode while being locked out in the charging mode.

A second set of normally closed charger sensing contacts 229 are coupled between the zero voltage bus and the enabling inputs of the NAND gates 230, 231 and 241. Thus, with no charger present, each of the aforementioned NAND gates has a first input at a high level. Additionally, the signal coupled via normally closed contacts 229 is connected directly to the input of relay driver 223, causing current flow through contactor coil 105C and closing contacts 105. Contacts 105 are always closed during the motoring mode, and are provided mainly as a safety feature to break the armature circuit when the operator turns the key off such as during a malfunction.

As a condition precedent to energizing of the contactors to set up the power circuit portion of the armature control mode, the direction selector must be in either the forward or reverse position and the accelerator must be depressed to close switch 58. Amplifier 234 in response to the simultaneous presence of these conditions, causes its output to go low. More specifically, it is seen that closing of switch 46 or 47, in response to the selection of either forward or reverse gear, drives the output of the inverter 113 to a low level, which level acts through resistor 235 to reduce the bias on the non-inverting input of amplifier 234. Similarly, closing of the accelerator switch 58 acts through resistor 236 to increase the bias supply to the inverting input of amplifier 234. The presence of both of these conditions is sufficient to drive the output of the amplifier low. The low signal is coupled to the input of NAND gate 238 driving its output high, thus, providing a second enabling signal to NAND gate 230. The final input to NAND gate 230 is provided by NOR gate 239, which has its first input coupled to the Q output of the mode selector flip-flop 129. Accordingly, when the flip-flop is in the armature condition, the first input to the NOR gate 239 will be at a low level. The second input to NOR gate 239 is provided by the brake switch 60. With the brake switch open, the negative bias supply for the input of inverter 200 couples a negative signal to the input of NOR gate 239. In this condition, the output of NOR gate 239 is driven high, thus, providing the third high signal to the NAND gate 230 driving its output low. The low output from NAND gate 230 acts through inverter 240 to drive the output thereof high, energizing relay driver 220, causing current flow through coil 101C, and closing contacts 101. Similarly, the low output of NAND gate 230 acts through the NAND gate 241 to drive the output thereof high, energizing relay driver 221, causing current flow through coil 102C and closing contacts 102. Thus, the power switching portion of the circuit is energized in the armature control mode and the duty cycle of the chopper may be increased to cause the motor to accelerate. A NAND gate 242 is provided to maintain the circuit in the armature control mode after the accelerator is released until the armature current decreases to an acceptable level. It is seen that the first input of NAND gate 242 is coupled to the output of NAND gate 241 and thus, will remain high as long as the logic circuitry remains in the armature control mode. The second input of NAND gate 242 is driven by the amplifier 204 which, it is recalled, maintains its output at a high level as long as the armature current is greater than 60 amps. Thus, if the accelerator is released, relays 101 and 102 will remain energized until the armature current falls below 60 amps, at which point, NAND gate 238 will be satisfied driving its output low thus, disabling NAND gate 230.

For causing the power contacts to shift from the armature control mode to the field control mode, sensing means are provided for detecting the transition of the mode control flip-flop 129, shown herein as NAND gate 244. The NAND gate has a first input driven by inverter 200, adapted to maintain such input at a high level unless the brake is depressed. The second input of NAND gate 244 is derived from the forward and reverse selectors 46, 47 so that the NAND gate may be enabled only if the vehicle is in gear. The final input of NAND gate 244 is driven by the Q output of the mode control flip-flop 129. Thus, when such Q output is driven at a high level, establishing the field control mode, the output of the NAND gate 244 is driven low. This low signal is coupled to the input of NAND gate 231, driving its output high, energizing relay driver 222, causing current flow in coil 103C, and closing contacts 103. Simultaneously with the foregoing, the high signal on the Q output of the mode control flip-flop acts upon the input of NOR gate 239 to drive the output thereof to a low level. This low signal is coupled to the input of NAND gate 230 causing the output thereof to be switched to a high level, such high level acting through NAND gate 241 and inverter 240 to de-energize relay drivers 220 and 221, allowing contacts 101 and 102 to open. It will be appreciated that contactors of equivalent size will close much faster than they will open, especially if transient suppression networks are coupled around the coils of the contactors. Thus, although the signals for closing relay 103 and opening relays 101 and 102 occur simultaneously, relay 103 will close before relays 101 and 102 will open, achieving the full voltage switching previously described.

It should be noted that the illustrated form of the invention utilizes a series stabilized separately excited d.c. motor 102. While such an arrangement is beneficial in achieving speed control of the motor, the series stabilizing field has a detrimental effect in regenerative braking, since it opposes the flux produced by the shunt field. Accordingly, means are provided for removing the series stabilizing field from the circuit during regenerative braking. Recalling that one of the inputs of NAND gate 244 is coupled to the output of inverter 200 which, in turn, responds to the depression of the braking switch, it will be seen that when the brake is depressed, the output of the NAND gate 244 is driven to a high level. In response thereto, the output of NAND gate 231 is driven low thus, de-energizing relay coil 103C and opening contacts 103. During the period when acceleration has ceased and braking just initiated, the duty cycle of the chopper is advanced thus, decreasing the positive current in the armature. Accordingly, when contacts 103 are opened, the current carried through the contacts is not extremely large. In response to a signal from potentiometer 61 demanding braking current, the duty cycle control circuit will advance the duty cycle, increasing the field and causing the armature to return power to the battery. Such current is allowed to flow through switching means shown herein as a diode 108. It is seen that the diode 108 is positioned between the negative bus 41 and the series field so that it bypasses the series field for reverse armature current eliminating it from the regenerative braking circuit. It will also be apparent that the diode 108 may be replaced with a set of contacts, if desired.

In accordance with a further feature of the invention, the power controller may be time shared to operate in a third or charging mode. In order to provide a feedback signal in such mode, a charge shunt 107 is coupled in series circuit arrangement with a charger 110, the chopper 70, and the propulsion battery 21. As described above, the charger 110 may take the form of a simple transformer-rectifier arrangement for providing raw d.c. power, to be modulated by the time shared controller. For allowing charging current to flow from the charger to the battery, contacts 102 and 103 are closed in the charging mode. More specifically, recalling that when a charger is connected to the vehicle the contacts 229 are open, it is seen that such contacts remove the high signal from the input of NAND gates 231 and 241, causing the outputs thereof to be driven to a high level. In response relay drivers 221 and 222 are energized with the effect of closing contacts 102 and 103.

For controlling the duty cycle of the chopper in response to actual charging current, a charge control 250 is provided, having a pair of inputs 255, 256 coupled across the charging shunt 107. Recognizing that charging circuits and controls therefor are familiar to those skilled in the art, and that numerous circuits might be constructed for providing a control signal of the proper level for controlling the duty cycle of the chopper herein, we have not attempted to show the details of the control 250, itself. However, in view of the foregoing disclosure, it will be apparent that the configuration of amplifier 251, diagrammatically illustrated within the charger control 250, is preferably like that of the armature current sensing amplifier 120, so as to produce a signal proportional to the actual amount of charging current. A resistor 254, coupling the output of amplifier 251 to the input of an amplifier 252 shows that the actual charging current signal produced by amplifier 251 may be coupled to a summing junction where it may be compared with a charge current demand signal, causing amplifier 252 to function in a manner similar to amplifier 118. Charge demand signals may be provided by various means, a simple example being a properly biased potentiometer having a wiper coupled to the summing junction at the input of amplifier 252. Finally, the output of the charger control 250 is coupled through a diode 253 to the input of the phase delay comparator 171, causing the phase delay comparator to respond to the signal produced by duty control amplifier 135.

In order to prevent the vehicle from being used when the battery is substantially discharged, an undervoltage circuit 254 is coupled to the output of the propulsion battery, and is adapted to provide a signal to the amplifier 118, such signal simulating a positive armature current when the terminal voltage of the battery drops below a desirable level. Thus, with the terminal voltage of the battery below standard, the operating speed of the vehicle will be substantially limited, making the need for a recharge apparent to the operator.

An overvoltage limit circuit 255 also responds to the terminal voltage of the battery, in order to limit the duty cycle of the chopper if the terminal voltage exceeds a desirable value. Such circuit is effective to prevent excessive voltages from damaging the battery during charging.

For preventing the armature from drawing excessive currents, a current limit circuit 256 is provided, having a summing junction formed at its inverting input, such junction being coupled to the output of the armature current sensing amplifier 120 and to the Q output of the mode control flip-flop 129. Thus, in the armature control mode, if excessive currents are sensed by the amplifier 120, the output of the amplifier 256 will be driven negatively. As the output of amplifier 256 is coupled to the inverting input of the duty cycle control amplifier 135, excessive levels of current will tend to retard the duty cycle, thus establishing an upper limit for armature current.

Finally, an overspeed limit circuit is provided for limiting the maximum rotational speed of the motor. Such a circuit is important for protecting the vehicle under conditions when the motor may be driven with little reverse torque applied thereto, causing the speed to increase rapidly in an effort to generate the necessary back EMF. Such a condition may occur, for example, when operating the vehicle on ice. If an overspeed limit were not provided, and the accelator were continually depressed, the motor would continue to accelerate until centrifugal forces ultimately destroyed the motor.

In order to prevent such occurrence, an overspeed limit circuit, responsive solely to signals within the control circuit, establishes a lower limit for field flux in the field mode, and prevent the duty cycle from being retarded beyond the point where this minimum flux is produced. The minimum flux necessary for preventing the rotational speed of the motor from exceeding its rated value may be determined from the following expressions:

$$E_{a\,0} = K_e \phi_{min} N_{max} + R_A I_a \quad (1)$$

where $E_a$ is the armature voltage, $K_e$ is a motor constant, $\phi_{min}$ is the minimum flux needed to limit motor speed to $N_{max}$, $N_{max}$ is the maximum rotational speed of the motor, $R_A$ is the armature resistance, and $I_a$ is the armature current.

The field flux may be expressed as:

$$\phi = K_\phi [N_s I_a + N_F T_F] \quad (2)$$

where $\phi$ is the total field flux, $K_\phi$ is a motor constant, $N_s$ is the number of turns in the series field, $I_a$ is the armature current, $N_F$ is the number of turns in the shunt field current.

Solving equation (1) for $\phi_{min}$, substituting that expression into equation (2) and solving for $I_F$ yields the following:

$$I_{F_{min}} = \frac{E_a}{K_e K_\phi N_F N_{max}} - \left[ \frac{R_A}{K_e K_\phi N_F N_{max}} + \frac{N_s}{N_F} \right] I_A \quad (3)$$

It will be appreciated that each factor in the denominator of the first term, as well as each factor in the bracketed expression, is a constant, the value of which may be ascertained for a given motor. Therefore for a particular motor configuration, equation (3) reduces to $$I_{F_{min}} = K_1 E_a = K_2 I_a \quad (4)$$

Realizing that in the field control mode, the battery is coupled directly across the armature, it is seen that the terminal voltage of the battery may be sensed to provide a value for $E_a$.

In order to provide a measure of the field current, the shunt field is connected through switch 43 to the positive bus by way of the charging shunt 107. With this arrangement, the amplifier 251 provided for the purpose of generating a signal proportional to the charging current in the charge mode, also functions in the motoring mode to indicate field current. Accordingly, the output of amplifier 251 is coupled through a resistor 281 to the inverting input of overspeed limit amplifier 282. The amplifier 282 serves to compare the field current signal with a signal related to armature current provided by amplifier 120 through resistor 283 and a signal related to the armature voltage provided by resistors 284, 285 coupled to the propulsion battery. The relative values of the resistors are selected to account for the constants in equation (4), thus causing amplifier 282 to respond according to that expression for setting a lower limit on the field current. It is seen that if the field current is comparatively high, the output signal produced by amplifier 250 will be driven negatively from its quiescent value. Accordingly the output of amplifier 250 will cause the current flow through resistor 281 away from the summing junction at the inverting input of amplifier 282, maintaining the output thereof at a relatively high level. However as the field current decreases (or the right hand side of equation (4) increases) to the point where ($K_1 E_a - K_2 I_a$) dominates the field current, the output of the amplifier 282 will be driven negatively. The amplifier output is coupled through a resistor 286 to the summing junction at the inverting input of the duty cycle control amplifier 135. The output of amplifier 135 is thus driven in a positive direction acting upon the phase delay comparator 171 to advance the duty cycle thereby increasing the chopper output to the shunt field.

It is also desirable in a vehicle of the type described to indicate the actual state of charge of the battery. A circuit capable of efficiently achieving this end is described and claimed in our application Ser. No. 548913 entitled Battery State of Charge Gauge and assigned to the same assignee as the present invention. Such a circuit is illustrated in the instant application as block 260. It is seen that the battery state of charge indicator requires only five inputs from the various points in the illustrated control circuit; as described in the aforementioned application, this circuit processes such signals in a manner to accurately indicate the actual amount of usable energy remaining in the battery. The following inputs are used in such a circuit: input 261 coupled to the output of the phase delay comparator for indicating the ratio between the time of conduction to the total period of the chopper $$\left( \frac{t_{on}}{T} \right);$$

input 262 coupled to the Q output of the mode control flip-flop 129 for indicating that the armature is coupled directly across the battery in the field control mode (Field Mode); input 263 coupled to the output of amplifier 120 for indicating the actual armature current ($I_{arm}$); input 264 coupled to the output of the D/A converter 160 for providing a ramp signal to produce an internal duty cycle signal (Ramp); and input 265 coupled to the output of inverter 240 for providing a factor relating to field current in the armature control mode (Armature mode). Naturally, the actual terminal voltage of the propulsion battery is also sensed by the state of charge indicator. The expressions in paranthesis above indicate the designation of the various signals used in both the instant and the aforementioned applications.

As noted above, an accessory battery 24 electrically isolated from the propulsion system is provided for powering the accessories of the vehicle. Such accessories are illustrated schematically in FIG. 3a at 25. Means may effectively be provided to recharge such battery by harvesting a portion of the excess energy from the inverting commutator circuit and coupling it to the accessory battery. Such a circuit is described and claimed in application Ser. No. 548,914 in the name of Robert Bourke filed concurrently herewith, entitled Charger Circuit For Accessory Battery and assigned to the same assignee as the present invention. As illustrated schematically in FIG. 3a, the charger 270 is adapted to charge the auxiliary battery 24, using energy coupled inductively via diagrammatically illustrated coil 271 from the propulsion circuit, thus, remaining electrically isolated therefrom.

The power control circuit described above utilizing the interphase transformer 77 is well adapted for use in the time shared mode. As described more fully in our application Serial No. entitled Power Converter, filed concurrently herewith and assigned to the same assignees as the present invention, the structure of the interphase transformer provides a magnetic shunt which simulates a series inductance between the output of the converter and the input of the power utilization device. When the power utilization device is the propulsion battery itself, as in the charging mode, this inductance is important in limiting high frequency transients. However, as currents increase the magnetic shunt tends to saturate, causing the series inductance to disappear. However, we have recognized that the series inductance is not important in our high current utilization of the chopper as high current is used only in motoring wherein the inductance of the motor effectively serves to limit such transients.

We claim as our invention:

1. A propulsion system for an electrical vehicle comprising in combination, a propulsion battery, a separately excited d.c. motor for propelling the vehicle, said motor having an armature winding and a field winding, a proportional controller, control signal producing means responsive to a command signal and a signal indicative of a motor operating condition for increasing or decreasing the operating level of the controller to drive the motor in accordance with the command signal, switching means for establishing a motor circuit including an armature control mode and a field control mode, said switching means including means for interposing the controller between the battery and the armature and means for coupling the field to the battery in said armature control mode, said switching means further including means for interposing the controller between the battery and the field and means for coupling the armature to the battery in said field control mode, means for detecting the maximum operating level of the controller, and means responsive to said detecting means and said control signal producing means and operative upon said switching means for causing said switching means to switch from one of said modes to the other of said modes when said controller is at maximum operating level and said control signal producing means requires a further increase in said operating level, whereby said controller is safely switched between modes to control the motor in respective armature and field control modes.

2. The propulsion system as set forth in claim 1 wherein said control signal producing means responds to current in the motor armature.

3. The propulsion system as set forth in claim 1 wherein said control signal producing means comprises means for providing a command signal for demanding a desired value of armature current, means for providing a feedback signal indicative of actual armature current, means for comparing the command and feedback signals to produce a control signal, and means coupling the control signal to said controller for establishing the operating level of said controller at the level where the desired and actual values of armature current are coincident.

4. The propulsion system as set forth in claim 3 wherein said means responsive to the detecting means responds to the control signal for causing said switching means to switch from the armature control mode to the field control mode when the controller is at its maximum operating level and the actual armature current is less than the demanded armature current.

5. The propulsion system as set forth in claim 4 wherein the maximum operating level of said controller produces an output voltage substantially equal to the voltage of the propulsion battery whereby mode switching is accomplished in a substantially continuous manner with the voltage applied to said armature and said field of the motor both being at substantially the voltage of the battery immediately before and immediately after mode switching.

6. A propulsion system for an electrical vehicle comprising in combination, a propulsion battery for providing operating power, a separately excited d.c. drive motor for propelling the vehicle, a variable duty cycle controller having an input and an output, said input being coupled to the propulsion battery, the drive motor having an armature winding and a field winding, switch means for selectively coupling the controller output and the battery to the motor armature and motor field, said switch means having an armature control mode wherein the battery is coupled across the field winding and the output of the controller is coupled to the armature winding, said switch means having a field control mode wherein the battery is coupled across the armature winding and the controller output is coupled to the field winding, mode control means for establishing the respective modes of the switch means, duty cycle control means for varying the operating duty cycle of the controller thereby to control the motor speed, and means responsive to the operating duty cycle of the controller for energizing the mode control means to switch from one of said modes to the other of said modes when said operating duty cycle is at a maximum.

7. The propulsion system as set forth in claim 6 including means for providing a command signal for demanding a desired value of armature current, means for providing a feedback signal indicative of actual armature current, means for comparing the command and feedback signals to produce a control signal, and means coupling said control signal to the duty cycle control means for setting the duty cycle at a level where the actual armature current corresponds to the demanded armature current.

8. The propulsion system as set forth in claim 7 further including means for providing a braking signal for demanding a desired value of reverse armature current, means coupling said braking signal to the comparing means, the control signal produced by said comparing means in response thereto serving to advance the duty cycle for causing said armature to return current to the battery.

9. The propulsion system as set forth in claim 1 further including a source of d.c. power for charging the propulsion battery, and means coupling said controller between the source and the propulsion battery for controlling the charging of said battery, whereby the controller serves as both a motor control and a charging regulator.

10. A propulsion system for an electrical vehicle comprising in combination a propulsion battery for providing power to the vehicle, a d.c. motor for propelling the vehicle, said motor having an armature winding and a field winding, a variable duty cycle power controller having an input coupled to the propulsion battery and an output, accelerator means for producing a demand signal related to a demanded armature current, feedback means for producing a feedback signal related to the actual armature current, means for comparing the feedback signal and the demand signal to produce a control signal, means for producing an inverted control signal, a duty cycle control for setting the duty cycle of the converter, mode selector menas for establishing an armature control mode and a field control mode, switching means responsive to the mode selector means for coupling the armature to the output of the controller and coupling the field to the battery in the armature control mode and for coupling the armature to the battery and coupling the field to the controller in the field control mode, means responsive to the mode control means for coupling the control signal to the duty cycle control in the armature mode so that the duty cycle of the controller increases with increasing levels of control signal, means coupling the inverted control signal to the duty cycle control in the field control means so that the duty cycle of the converter is decreased with increasing levels of control signal, first mode switching means responsive to the duty cycle control and to the control signal for causing said mode control means to switch from armature control to field control when the duty cycle is at maximum and the control signal indicates that the actual armature current is less than the demanded armature current, whereby mode switching is accomplished with minimum stress on the switching elements.

11. The propulsion system as set forth in claim 10 further including second mode switching means responsive to the inverted control signal and the duty cycle control for switching the mode control means from the field mode to the armature mode when the duty cycle is at maximum and the inverted control signal indicates that the actual armature current is greater than the demanded armature current.

12. The propulsion system as set forth in claim 11 further including a braking control for producing a braking signal opposite in sense to the demand signal, means coupling the braking signal to the comparing means for comparing said braking signal to the signal indicative of actual armature current thereby to produce a control signal and an inverted control signal for demanding a reverse armature current, said inverted control signal in the field mode serving to increase the duty cycle of the converter thereby to strengthen the field and cause said armature to return power to the propulsion battery achieving a regenerative braking effect.

13. The propulsion system as set forth in claim 12 including means responsive to the signal indicative of actual armature current for producing a reset signal in response to reverse armature current less than a preset minimum, said reset means comprising an amplifier having biasing means for establishing said preset minimum, means coupling said reset signal to the mode switching means for switching said mode control means to the armature control mode thereby to terminate regenerative braking.

14. The propulsion system as set forth in claim 12 wherein the d.c. motor includes a series stabilizing field coupled to the armature, and further including switch means for shunting said series stabilizing field to pass said reverse armature current around said series stabilizing field thereby to enhance the regenerative braking effect.

15. The propulsion system as set forth in claim 10 wherein said controller comprises a dual chopper.

16. The propulsion system as set forth in claim 15 including a commutating inverter for commutating said chopper, said inverter including first inductive means for conducting oscillating currents, second inductive means coupled in said chopper circuit and magnetically coupled to the first inductive means, firing of said inverters serving to couple energy to the chopper circuit for commutating the same.

17. The propulsion system as set forth in claim 16 wherein the commutating inverter is operated at a fixed frequency, said duty cycle control means serving to vary the firing phase of the chopper with respect to the commutating inverter thereby to provide fixed frequency duty cycle control.

18. The propulsion system as set forth in claim 10 further including overspeed limit means responsive to conditions within the controller circuit for limiting the maximum rotational speed of the motor.

19. The propulsion system as set forth in claim 18 wherein the overspeed limit means comprises overspeed limit amplifier means coupled to the feedback means and to terminal battery voltage for setting a minimum safe value for field flux.

20. The propulsion system as set forth in claim 19 including means for producing a signal proportional to actual field current and coupling said signal to the overspeed limit amplifier means for providing an indication of motor field flux.

21. The propulsion system as set forth in claim 10 further including undervoltage means responsive to the voltage of the propulsion battery for limiting the rotational speed of the motor under conditions when the propulsion battery is substantially discharged, thereby to protect said battery.

22. The propulsion system as set forth in claim 21 wherein said undervoltage means is coupled to said comparator means and to provide a signal thereto simulating an additional actual armature current under conditions when said battery is substantially discharged.

23. The propulsion system as set forth in claim 10 including current limit means having an output coupled to the duty cycle control, means for energizing said current limit means during said armature control mode, and means coupling said current limit means to the feedback signal producing means for providing a duty cycle limit in the event said armature current exceeds a predetermined maximum.

24. The propulsion system as set forth in claim 10 further including shift means for selecting forward and reverse directions of vehicle operation, said shift means including polarity switching means coupled to the armature for controlling the direction of rotation of said motor.

25. The propulsion system as set forth in claim 24 further including means responsive to the shift means and operative on the mode control means for locking said mode control means in the armature mode when said reverse direction is selected thereby to limit vehicle speed in the reverse direction.

26. A propulsion system for a battery powered electrical vehicle comprising in combination, a separately excited d.c. motor for propelling the vehicle, said motor having an armature winding and a field winding, a proportional controller, control signal producing means responsive to a command signal and a signal indicative of a motor operating condition for increasing or decreasing the operating level of the controller to drive the motor in accordance with the command signal, switching means for establishing an armature control mode and a field control mode for said motor, said switching means including means for interposing the controller between the power battery and armature and means for coupling the field to the battery in said armature control mode, said switching means further including means for interposing the controller between said battery and the field and means for coupling the armature to said battery in said field control mode, means for detecting the maximum operating level of the controller, and means responsive to said detecting means and said control signal producing means and operative upon said switching means for causing said switching means to switch from one of said modes to the other of said modes when said controller is at maximum operating level and said control signal producing means requires a further increase in said operating level, whereby said controller is safely switched between modes to power the motor in respective armature and field control modes.

* * * * *